(12) United States Patent
Lee et al.

(10) Patent No.: US 10,514,488 B2
(45) Date of Patent: Dec. 24, 2019

(54) FLAT PANEL DISPLAY EMBEDDING OPTICAL IMAGING SENSOR

(71) Applicant: LG DISPLAY CO., LTD., Seoul (KR)

(72) Inventors: Guensik Lee, Seoul (KR); Kyoseop Choo, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 18 days.

(21) Appl. No.: 15/819,992

(22) Filed: Nov. 21, 2017

(65) Prior Publication Data

US 2018/0149792 A1    May 31, 2018

(30) Foreign Application Priority Data

Nov. 29, 2016  (KR) .................. 10-2016-0160263

(51) Int. Cl.
   *G02B 5/32*    (2006.01)
   *F21V 8/00*    (2006.01)
   *G06K 9/00*    (2006.01)

(52) U.S. Cl.
   CPC .............. *G02B 6/0035* (2013.01); *G02B 5/32* (2013.01); *G06K 9/00013* (2013.01); *G02B 6/003* (2013.01); *G02B 6/0018* (2013.01); *G02B 6/0051* (2013.01); *G02B 6/0053* (2013.01)

(58) Field of Classification Search
   None
   See application file for complete search history.

(56) References Cited

U.S. PATENT DOCUMENTS

| 8,564,314 B2 | 10/2013 | Shaikh et al. |
| 2007/0183038 A1* | 8/2007 | Hwang ............... G02B 6/0038 359/487.02 |
| 2013/0307818 A1 | 11/2013 | Pope et al. |
| 2014/0028629 A1 | 1/2014 | Drumm et al. |
| 2016/0266695 A1 | 9/2016 | Bae et al. |

FOREIGN PATENT DOCUMENTS

| EP | 3 239 824 A1 | 11/2017 |
| JP | 10-289304 A | 10/1998 |
| JP | 2000-30034 A | 1/2000 |
| JP | 2001-351099 A | 12/2001 |

(Continued)

OTHER PUBLICATIONS

Kanbara, "Dispersion optical fingerprint sensor" Monthly display, Japan Techno Times Inc., 12(8):76-81, 2006, 10 total pages.

*Primary Examiner* — Darryl J Collins
*Assistant Examiner* — Journey F Sumlar
(74) *Attorney, Agent, or Firm* — Seed Intellectual Property Law Group LLP

(57) ABSTRACT

The present disclosure relates to a flat panel display embedding an optical imaging sensor such as a fingerprint image sensor. The present disclosure suggests a flat panel display embedding an image sensor comprising: a display panel including a display area and a non-display area; and a directional optical unit having a length and a width corresponding to the display panel and a thickness, and attached on a top surface of the display panel, wherein the directional optical unit provides a sensing light to the display area, and wherein the sensing light is collimated and directionized to a predetermined direction.

17 Claims, 5 Drawing Sheets

(56) References Cited

FOREIGN PATENT DOCUMENTS

| | | |
|---|---|---|
| JP | 2005-130091 A | 5/2005 |
| KR | 10-0608171 B1 | 8/2006 |
| KR | 10-1432988 B1 | 8/2014 |
| KR | 10-2016-0043216 A | 4/2016 |
| WO | 2014/112913 A1 | 7/2014 |
| WO | 2015/108477 A1 | 7/2015 |

\* cited by examiner $T_{CP\_AIR} < \alpha < T_{VHOE\_LR} < \theta$ ex) $45° < \alpha < 55°$
$70° < \theta < 75°$

FLAT PANEL DISPLAY EMBEDDING OPTICAL IMAGING SENSOR

This application claims the benefit of Korea Patent Application No. 10-2016-0160263 filed on Nov. 29, 2016, which is incorporated herein by reference for all purposes as if fully set forth herein.

BACKGROUND

Technical Field

The present disclosure relates to a flat panel display embedding an optical imaging sensor such as a fingerprint image sensor. Especially, the present disclosure relates to a flat panel display embedding an optical imaging sensor including an ultra thin substrate providing the directional lights and an optical imaging sensor.

Description of the Related Art

Various computer based systems including the notebook computer, the tablet personal computer (or, PC), the smart phone, the personal digital assistants, the automated teller machines and/or the search information system have been developed. As these devices use and store the various personal information as well as the business information and the trade secrets, it is required to strength the securities for preventing these important data being leaked.

To do so, one method has been suggested for strengthening the security using an image sensor recognizing the authorized user's biological information. For example, the fingerprint sensor is generally used for enhancing the security when registering and authenticating is performed. The fingerprint sensor is for sensing the fingerprint of user. The fingerprint sensor may be categorized into the optical fingerprint sensor and the capacitive fingerprint sensor.

The optical fingerprint sensor uses a light source such as a light emitting diode (or LED) to irradiate lights and detects the lights reflected by the ridge of the fingerprint using a CMOS (or, complementary metal oxide semiconductor) image sensor. As the optical fingerprint sensor may scan the fingerprint using the LED lights, it is required that the sensor is equipped with an additional device for performing the scan process. There is a limitation to increasing the size of the object for scanning the image. Therefore, there are limitations for applying the optical fingerprint sensor to various applications such as combining with the display devices.

For conventional optical fingerprint sensors, known are a Korean patent 10-060817 registered on Jun. 26, 2006 of which title is "A display apparatus having fingerprint identification sensor" and a Korean patent application 10-2016-0043216 published on Apr. 21, 2016 of which title is "Display device including fingerprinting device".

The above mentioned optical fingerprint sensor is configured to use the display area as the touch area for inputting the user's selection and the sense area for sensing the fingerprint. However, this optical fingerprint sensor uses the diffused (or diverged) lights having very low directivity. Therefore, there is a limitation to recognize the exact fingerprint pattern. When using the collimated lights such as the infrared laser having high directivity, it is very hard to generating the sensing lights as covering the wider area. Therefore, the fingerprint sensing area is restricted in small area. In order to radiate the collimated lights over the wider scan area, specific scanning structure is required, so that this system is not suitable for portable or personal display apparatus.

Therefore, for portable devices embedding the fingerprint sensor, the capacitive fingerprint sensor is mainly used. However, the capacitive fingerprint sensor also has many problems.

The capacitive fingerprint sensor is configured to detect the difference of the electricity between the ridge and the valley of the fingerprint contacting on the fingerprint sensor. For conventional capacitive fingerprint sensors, known is a US patent application 2013/0307818 published on Nov. 21, 2013 of which title is "Capacitive Sensor Packaging".

The above mentioned capacitive fingerprint sensor is configured as an assembly type embedding with a specific push button. It comprises a capacitive plate and a silicon wafer having a circuit for detecting the capacitive storage between the ridge and valley of the fingerprint. Generally, as the sizes of the ridge and valley of the fingerprint are very tiny, about 300~500 μm (micrometer), the capacitive fingerprint sensor needs a high resolution sensor array and an integrated chip (or IC) for processing the fingerprint detection. To do so, the silicon wafer is configured to include the sensor array and the IC on one substrate.

However, when the high resolution sensor array and the IC are formed on the same silicon wafer, the assembly structure for joining the push button with the fingerprint sensor. Therefore, the structure would be very complex and further the non-display area (or bezel area) may be increased. In some cases, the push button (i.e., the home key of the smart phone) would be overlapped with the fingerprint sensor, so that the thickness of the whole device would be thick. Further, the sensing area for the fingerprint would be dependent on the size of the push button.

To solve above mentioned problems and limitations, some technologies have been suggested in which the touch sensor area is used as for sensing the fingerprint. For example, known are a U.S. Pat. No. 8,564,314 registered on Oct. 22, 2013 of which title is "Capacitive touch sensor for identifying a fingerprint", and a Korean patent 10-1432988 registered on Aug. 18, 2014 of which title is "A capacitive touch screen for integrated of fingerprint recognition".

In general cases of the personal portable devices such as the smart phones, an additional transparent film is attached for protecting the display glass panel. When the above mentioned technologies are applied to the personal portable devices, as attaching the protective film thereon, the performance for sensing or recognizing the fingerprint exactly would be remarkably degraded. In general, even though the protective film is attached, the touch function may be properly operated. However, the detection ability for the difference of the capacitive storage amount for sensing the fingerprint may be deteriorated by the protective film even though its thickness is very thin.

For a display embedding the capacitive fingerprint sensor, generally a protective film or a hardening glass may be further attached on the cover glass of the display. In that case, the recognition ability may be deteriorated. That is, the total thickness of the cover glass may affect to the sensitivity of the capacitive fingerprint sensor. In the interim, the diffused lights used in the sensing light source may affect to the sensitivity of the optical fingerprint sensor. When using the collimated lights for enhancing the sensitivity of the optical fingerprint sensor, the bulky and/or complex optical devices are required so that it is very hard to apply to a display for personal mobile device.

BRIEF SUMMARY

In order to overcome the above mentioned drawbacks, a purpose of the present disclosure is to suggest a flat panel display embedding an ultra thin optical image sensor (or an optical image recognition apparatus). Another purpose of the present disclosure is to suggest a flat panel display having an optical image sensor in which most of all or whole surface of the display panel would be used for the sensing area. Still another purpose of the present disclosure is to suggest a flat panel display embedding an optical image sensor in which a directional light is used as a sensing light covering large surface. Yet another purpose of the present disclosure is to suggest a flat panel display embedding an ultra thin and large area optical image sensor of which resolution and sensitivity are very high and/or superior.

In order to accomplish the above and other purposes, the present disclosure suggests a flat panel display embedding an image sensor comprising: a display panel including a display area and a non-display area; and a directional optical unit attached to a surface of the display panel, the directional optical unit having a length and a width sized to cover the surface of the display panel and a thickness, the directional optical unit includes: a cover plate having a size corresponding to the length and the width of the directional optical unit; a light radiating film that covers the display area under the cover plate; a light incident film disposed outside of the display area at one lateral side of the light radiating film, under the cover plate; a low refractive layer disposed under the light radiating film and the light incident film, the low refractive layer having a refractive index lower than a refractive index of the cover plate and lower than a refractive index of the light radiating film; a sensing light controlling film disposed under the low refractive layer; and a light source disposed at a lateral side of the display panel and facing the light incident film.

In one embodiment, the light source provides an incident light to an incident point defined on a surface of the light incident film; the light incident film includes a first holographic pattern that converts the incident light to a propagating light having an incident angle satisfying an internal total reflection condition of the cover plate, and that sends the propagating light into the cover plate; the light radiating film includes a second holographic pattern that converts some of the propagating light into sensing light having a reflection angle which satisfies a total reflection condition at a top surface of the cover plate and a transmitting condition through the low refractive layer; and the sensing light controlling film includes a third holographic pattern that converts the sensing light into an erect sensing light that enters into the display panel at a direction perpendicular to the surface of the display panel.

In one embodiment, the propagating light has an expanding angle on a horizontal plane including a length axis and a width axis of the directional optical unit, and maintains a collimated state on a vertical plane including the length axis and a thickness axis of the directional optical unit; the incident angle of the propagating light is larger than a total reflection critical angle at a first interface between the light radiating film and the low refractive layer; and the reflection angle of the sensing light is larger than a total reflection critical angle at a second interface between the cover plate and an air layer, and smaller than the total reflection critical angle at the first interface between the light radiating film and the low refractive layer.

In one embodiment, the expanding angle is equal to or greater than an inner angle between a first line and a second line, the first line is a line connecting the incident point and one end of an opposite side of the cover plate facing the light incident film, and the second line is a line connecting the incident point and another end of the opposite side of the cover plate.

In one embodiment, the directional optical unit further comprises: a horizontal collimating film disposed spaced apart from the light incident film along a direction of the propagating light and covering the width of the directional optical unit, wherein the expanding angle is equal to or greater than an inner angle between a first line and a second line, the first line is a line connecting the incident point and one end of the horizontal collimating film, and the second line is a line connecting the incident point and another end of the horizontal collimating film, and the horizontal collimating film has a fourth holographic pattern for horizontally collimating the propagating light having the expanding angle on the horizontal plane corresponding to the width.

In one embodiment, the light source provides a collimated light having a circular cross-sectional shape.

The present disclosure suggests a flat panel display embedding an optical image sensor that has a high resolution recognizing ability or sensitivity by providing the directionized lights (or 'oriented') as the sensing lights. Comparing with the diffused lights used in the conventional art for the fingerprint sensor, because that the directionized lights according to the present disclosure are used for sensing the image without any loss of lights so that the present disclosure has the merits of the higher resolution and the superior sensitivity. The present disclosure provides a flat panel display embedding a large area optical image sensor in which a collimated infrared laser beam is expanded over a large area corresponding to the display panel for the sensing lights using a holography technology. The present disclosure provides a flat panel display having an ultra thin optical image sensor in which a direction light is provided on the display surface within a thin thickness. Specifically, as the sensing lights enter perpendicularly into the top surface of the display substrate embedding the image sensors, the light amounts of the sensing lights are not reduced or lowered so that best quality of the image recognition can be acquired. Further, according to the present disclosure, the protective substrate disposed on the topmost surface is used as the cover substrate of the direction optical substrate. Using a holographic film, the collimated light is provided as covering the large area corresponding to the display surface so that the present disclosure suggests an ultra thin direction optical substrate. When joining the optical image sensor to the display device, the whole thickness of the display device is not thicker. As the image sensing area may be set freely within the display area of the display device, the flat panel display embedding an optical image sensor according to the present disclosure may be applied various applications.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Figure 1:
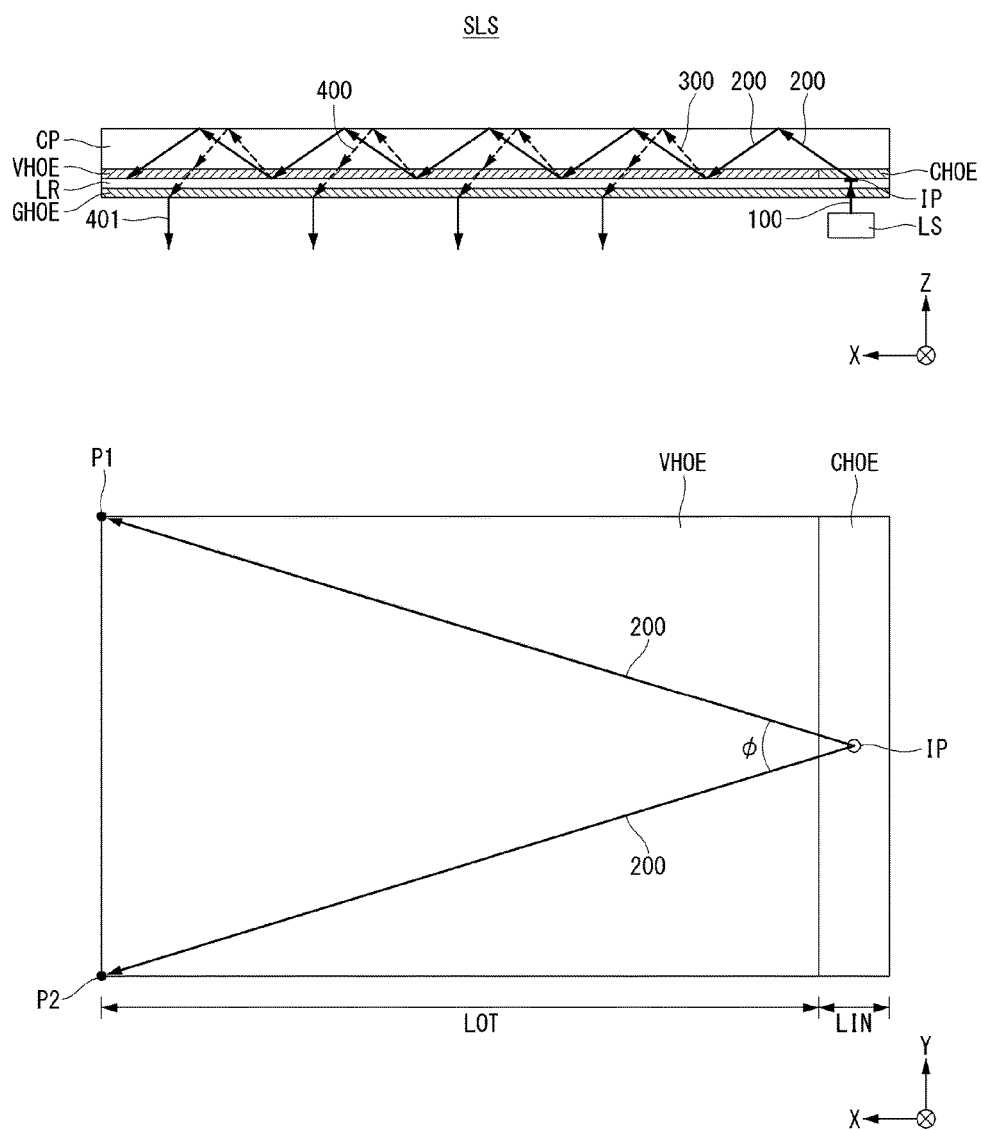
FIG. 1 is a drawing illustrating a structure of a directional optical substrate applied for a flat panel display embedding an optical image sensor according to the first embodiment of the present disclosure.

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

<First Embodiment>

Figure 2:
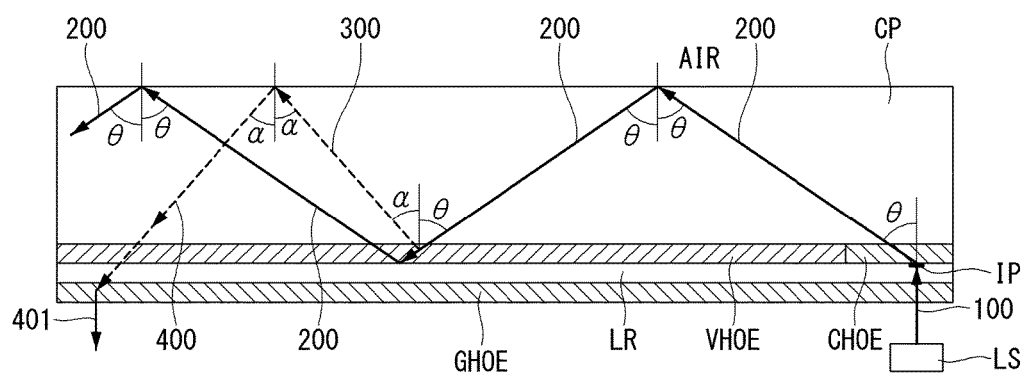
FIG. 2 is a cross sectional view illustrating light paths inside of the direction optical substrate according to the FIG. 1.

Hereinafter, referring to FIGS. 1 and 2, we will explain about the first embodiment of the present disclosure. FIG. 1 is a drawing illustrating a structure of a directional optical substrate applied for a flat panel display embedding an optical image sensor according to the first embodiment of the present disclosure. In FIG. 1, the upper drawing is a side view on the XZ plane and the lower drawing is a plane view on the XY plane.

Referring to FIG. 1, a directional optical unit according to the first embodiment comprises a directional optical substrate SLS and a light source LS. The directional optical substrate SLS includes a cover plate CP, a light radiating film VHOE, a light incident film CHOE, a low refractive layer LR and a sensing light controlling film GHOE. The cover plate CP may have a rectangular plate shape of which a length, a width and a thickness. In FIG. 1, the length is along to X-axis, the width is along to Y-axis and the thickness is along to Z-axis.

The directional optical unit is an optical device for providing the collimated light expanded covering a large area corresponding to a surface of the display. Therefore, it is preferable that the light source LS provides a collimated light.

On the bottom surface of the cover plate CP, the light radiating film VHOE and the light incident film CHOE is attached. The light radiating film VHOE is an optical element for providing the radiating lights 300. It is preferable that the light radiating film VHOE is disposed as corresponding to the area for detecting and/or sensing the image.

The light incident film CHOE is an optical element for converting the collimated light provided from the light source into the lights expanded over the area of the cover plate CP. It is preferable that the light incident film CHOE is disposed at outside of the light radiating film VHOE.

Specifically, the light incident film CHOE is disposed as facing with the light source LS.

It is preferable that the light radiating film VHOE and the light incident film CHOE may be disposed on the same plane level. Considering the manufacturing process, it is further preferable that the light radiating film VHOE and the light incident film CHOE are formed as being separated each other, on a same film. The light radiating film VHOE and the light incident film CHOE may be the optical elements having the holographic patterns. In this case, after disposing the master film for the light radiating film VHOE and the master film for the light incident film CHOE close each other, these two holographic patterns may be copied on one holographic recording film, at the same time.

Under the bottom surface of the light radiating film VHOE and the light incident film CHOE, a low refractive layer LR is disposed. It is preferable that the low refractive layer LR has the refractive index lower than that of the cover plate CP and the light radiating film VHOE. For example, the cover plate CP may be formed of a transparent reinforced glass of which refractive index is 1.5. The light radiating film VHOE and the light incident film CHOE may be the transparent holographic recording film and may have the refractive index same with or slightly larger than that of the cover plated CP. Here, we use the case that the refractive index of the light radiating film VHOE and the light incident film CHOE are same with that of the cover plate CP. It is preferable that the refractive index of the low refractive layer LR is similar with the refractive index of the scanning objects. For example, when applying to the fingerprint sensor, the low refractive layer LR may have the refractive index of 1.4 similar with the refractive index of human skin, 1.39.

The sensing light controlling film GHOE is disposed under the low refractive layer LR. The sensing light controlling film GHOE is an optical element for changing the direction of the sensing light as the sensing light enters perpendicularly onto the surface of the cover plate CP.

At the space under the light incident film CHOE, the light source LS is disposed as facing with the light incident film CHOE. Specifically, the light source LS is preferably disposed under the sensing light controlling film GHOE. It is preferable that the light source LS provides a highly collimated light such as the LASER beam. Specifically, when applying to the system in which the fingerprint sensor is embedded into a portable display, it is preferable that the light source LS provides the infrared laser beam which cannot be recognized by the human eyes.

The collimated light from the light source LS, as an incident light 100, having a predetermined cross sectional area is provided to a light incident point IP defined on the light incident film CHOE. It is preferable that the incident light 100 enters onto the normal direction with respect to the surface of the incident point IP. However, it is not restricted, in other case, the incident light 100 may enter onto the incident point IP with an inclined angle with respect to the normal direction.

The collimated light from the light source LS enters into the sensing light controlling film GHOE before entering into the light incident film CHOE. As the sensing light controlling film GHOE does not affect to the lights vertically entering into the light the sensing light controlling film GHOE, the collimated light passes the sensing light controlling film GHOE, without any conversion. When it is estimated that the intensity or amount of the light provided from the light source LS may be lowered as passing the sensing light controlling film GHOE, some of the sensing light controlling film GHOE corresponding to the area where the light from the light source LS would be radiated may be selectively removed.

The light incident film CHOE converts the incident light 100 into a propagating light 200 having an incident angle and sends it into the cover plate CP. Here, it is preferable that the incident angle is larger than the internal total reflection critical angle of the cover plate CP. As the results, as repeating the total reflection, the propagating light 200 is propagating inside of the cover plate CP along to the X-axis, the length direction of the cover plate CP.

The light radiating film VHOE converts some amount of the propagating light 200 into the radiating light 300 and refracts the radiating light 300 to upper surface of the cover plate CP. Others of the propagating light 200 would continuously be propagating inside of the cover plate CP. The radiating light 300 is totally reflected at the upper surface of the cover plate CP, but it would transparent the low refractive layer LR at the bottom surface of the cover plate CP so that the radiating light 300 goes out of the directional optical substrate SLS. In other words, the radiating light 300 totally reflected at the upper surface of the cover plate CP would be a sensing light 400 as passing through the bottom surface of the cover plate CP.

The sensing light 400 is reflected by the upper surface of the cover plate CP and goes ahead to the lower surface of the cover plate CP. Here, the sensing light 400 has the incident angle same with that of the radiating light 300. That is, the sensing light 400 is radiated as having an inclined angle with the lower surface of the cover plate CP. Under the directional optical substrate SLS, the photo sensors may be disposed for detecting the sensing light 400. The sensing light 400 enters into the photo sensor with the inclined angle. Therefore, the incident of the sensing light 400 may be lowered or weakened or some amount of the sensing light may be lost. In order that the sensing light 400 enters into the photo sensor without loss of the light amount or light intensity, it is prefer that the sensing light 400 is converted into an erect sensing light 401. It is preferable that the sensing light controlling film GHOE is a holographic element for converting the sensing light 400 into the erect sensing light 401.

As the propagating light 200 goes from the light incident film CHOE to the opposite side, a predetermined portion of the propagating light 200 is extracted as the radiating lights 300 by the light radiating film VHOE. The amount (or 'brightness' or 'luminance') of the radiating light 300 is decided by the light extraction efficiency of the light radiating film VHOE. For example, when the light extraction efficiency of the light radiating film VHOE is 3%, the 3% of the initial light amount of the propagating light 200 would be extracted at the first radiating point where the propagating light 200 firstly hits to the light radiating film VHOE. Then, the 97% of the propagating light 200 would be totally reflected at the first radiating point and goes on continuously. After that, at the second radiating point, 3% of the 97%, i.e., 2.91% of the initial amount of the propagating light 200 would be extracted as the radiating light 300.

Repeating this operation, a plurality of radiating lights 300 would be extracted from the first side where the light incident film CHOE to the opposite side. When the light radiating film VHOE has the light extraction efficiency same over all areas, the amount of the propagating light 200 is gradually lowered as propagating from the first side to opposite side. In order to get an evenly distributed amount of the lights over the whole area of the light radiating area, it is preferable that the light extraction efficiency of the light radiating film VHOE is exponentially increased from the first side to the opposite side.

As observing the propagating light 200 on the XZ plane (or, 'vertical plane') having the length axis and the thickness axis, the collimated condition of the incident light 100 is maintained. On the contrary, on the XY plane (or, 'horizontal plane') having the length axis and the width axis, it is preferable that the propagating light 200 is an diverged (or, expanded) light having an expanding angle, $\varphi$. The reason of expanding the propagating light 200 is that the image sensing area is set as covering most area of the cover plate CP. For example, it is preferable that the light radiating film VHOE has an area corresponding to the whole area of the light going-out part LOT. Further, it is preferable that the expanding angle $\varphi$ is the inside angle between two lines, one line is connecting the incident point IP and one end point P1 of the opposite side of the cover plate CP and the other line is connecting the incident point IP and other end point P2 of the opposite side of the cover plate CP.

The area where the light incident film CHOE is disposed would be defined as a light entering part LIN. The area where the light radiating film VHOE is disposed would be defined as a light going-out part LOT. The light going-out part LOT would be the light propagating part where the light is going through. In FIG. 1, the light incident film CHOE covers the whole area of the light entering part LIN, in convenience. Otherwise, it is enough that the light incident film CHOE has a size slightly larger than the size of the light incident point IP.

For example, the cross sectional size of the collimated light generated from the light source LS may have the right circle shape of which radius is 0.5 mm. The light incident film CHOE would have the length corresponding to the width of the cover plate CP and the width of 3 mm~5 mm. The light incident film CHOE may be disposed as crossing the width of the cover plate CP.

Hereinafter, referring to FIG. 2, we will explain how the collimated infrared light provided from the light source is converted into a directional infrared light used for image sensing inside of the directional optical substrate SLS. FIG. 2 is a cross sectional view illustrating light paths inside of the direction optical substrate according to the FIG. 1.

The incident light 100 provided from the light source LS enters onto the normal direction with respect to the surface of the incident point IP of the light incident film CHOE. The light incident film CHOE converts the incident light 100 into a propagating light 200 refracted as having an incident angle $\theta$ to the normal direction with respect to the surface of the incident point IP. And then, the light incident film CHOE provides the propagating light 200 to the inside space (or 'the media') of the cover plate CP.

It is preferable that the incident angle $\theta$ of the propagating light 200 is larger than the total reflection critical angle $T_{VHOE\_LR}$ at the interface between the light radiating film VHOE and the low refractive layer LR. For example, when the refraction index of the cover plate CP and the light radiating film VHOE is 1.5, and the refraction index of the low refractive layer LR is 1.4, it is preferable that the total reflection critical angle $T_{VHOE\_LR}$ at the interface between the light radiating film VHOE and the low refractive layer LR is greater than 69° (degree). Therefore, it is preferable that the incident angle $\theta$ is larger than 69°. For example, the incident angle $\theta$ may be any one of 70° to 75°.

As the upper surface of the cover plate CP is contacting to the air AIR, the propagating light 200 is totally reflected at the upper surface of the cover plate CP. It is because that the total reflection critical angle $T_{CP\_AIR}$ at the interface between the cover plate CP and the air AIR is about 41.4°. That is, when the incident angle θ is larger than the total reflection critical angle $T_{VHOE\_LR}$ at the interface between the light radiating film VHOE and the low refractive layer LR, the incident angle θ is always larger than total reflection critical angle $T_{CP\_AIR}$ at the interface between the cover plate CP and the air AIR.

The light radiating film VHOE converts a predetermined amount of the propagating light 200 into a radiating light 300 having a reflection angle a and sends the radiating light 300 back into the inside space of the cover plate CP. The radiating light 300 is for detecting an image of an object when the object is contacting on the upper surface of the cover plate CP. When there is no object on the outer surface of the cover plate CP, the radiating light 300 is totally reflected at the upper surface of the cover plate CP and then is provided to the photo sensor (or, optical sensor) disposed at the outside of the bottom surface of the directional optical substrate SLS. That is, after totally reflected at the upper surface of the cover plate CP, the radiating light 300 goes out of the directional optical substrate SLS through the bottom surface of the cover plate CP. All of the sensing lights 400 have the same reflecting angle so it may be called that the sensing lights 400 are oriented (or 'directionized') to a predetermined direction.

Detecting the sensing light 400 radiated out of the low refractive layer LR disposed under the bottom surface of the directional optical substrate SLS, the images of the object contacted on the upper surface of the cover plate CP would be recognized. The sensing light 400 is radiated with an inclined angle onto the lower surface of the cover plate CP. Under the directional optical substrate SLS, the photo sensors may be located. As the sensing light 400 enters into the photo sensor with an inclined angle, the intensity or the amount of the light may be lowered, weakened or lost. In order to prevent the loss or weakness of the light, the sensing light 400 would be converted into the erect sensing light 401 by the sensing light controlling film GHOE. Detecting the erect sensing light 401 by the photo sensor, the image of the object contacted on the upper surface of the cover plate CP is recognized.

Figure 3:
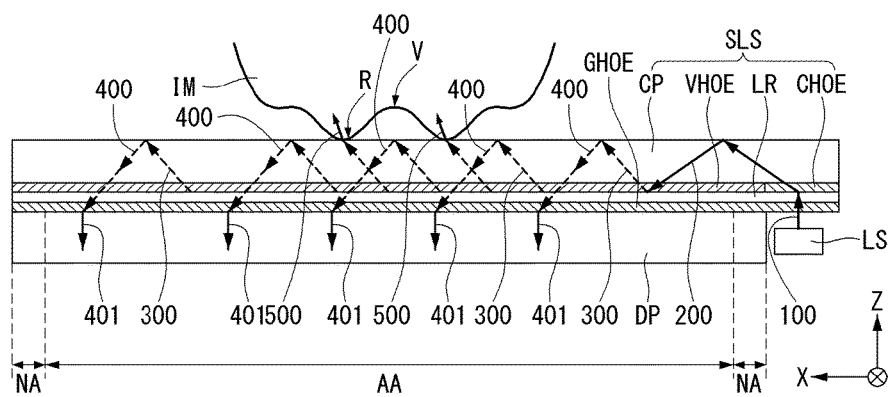
FIG. 3 is a drawing illustrating a structure of a flat panel display embedding an optical image sensor including a directional optical unit and an optical sensor, according to the first embodiment of the present disclosure.
Figure 3:
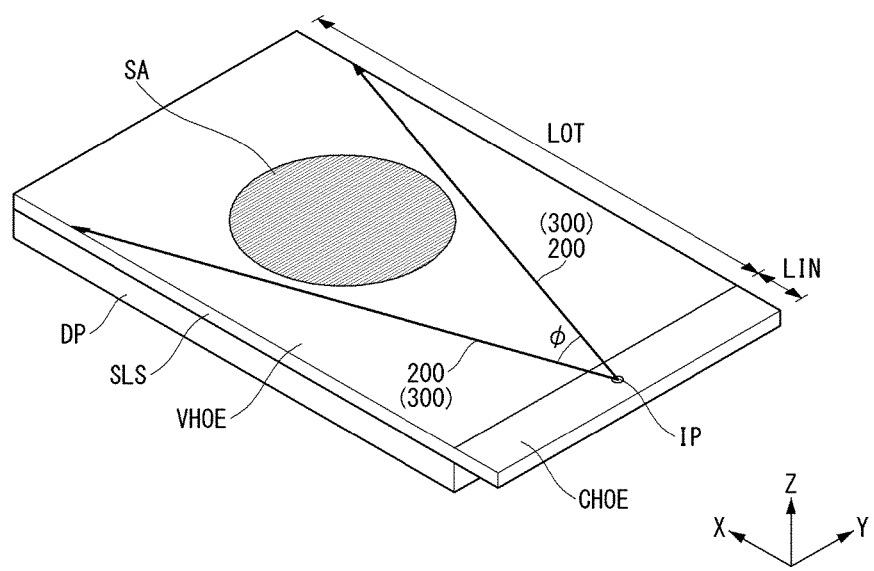

Hereinafter, we will explain about the image sensing device applying the directional optical unit as shown in FIG. 1. Specifically, we focus on a flat panel display embedding a fingerprint recognizing sensor. FIG. 3 is a drawing illustrating a structure of a flat panel display embedding an optical image sensor including a directional optical unit and an optical sensor, according to the first embodiment of the present disclosure.

Referring to FIG. 3, a flat panel display embedding an optical image sensor according to the first embodiment of the present disclosure comprises a display panel DP, a directional optical substrate SLS and a light source LS. The display panel DP includes a display area AA and a non-display area NA. The display area AA may be disposed at the middle portions of the display panel DP. The non-display area NA may be surrounding the display area AA. The display area AA may have a plurality of the display elements for representing the video images shown on the display panel DP. The non-display area may have a plurality of the driving elements for operating the display elements arrayed in the display area AA.

In detail, a plurality of pixel area for representing the video images may be arrayed in a matrix manner in the display area AA. At least one of the pixel areas, one photo sensor may be includes for detecting the image of the object. In some cases, one photo sensor may be disposed at one group of the pixel areas. For example, one photo sensor would be disposed at every pixel group including 2×2, 3×3 or 4×4 pixels.

The directional optical substrate SLS may be a thin plate having a predetermined length, width and thickness. It is preferable that the length and width of the directional optical substrate SLS has a size large enough to at least correspond to the size of the display panel DP. Specifically, it is preferable that the directional optical substrate SLS has a size slightly larger than that of the display panel DP so that the directional optical substrate SLS completely covers a surface of the display panel DP. At least, it is preferable that the directional optical substrate SLS has the extended (or expanded) area over one side of the display panel DP. At the extended side area over the display panel DP, the light source LS may be disposed.

The directional optical substrate SLS may be joined with the display panel DP as it is attached on the upper surface of the display panel DP. The directional optical substrate SLS includes a cover plate CP, a light radiating film VHOE, a light incident film CHOE, a low refractive layer LR and a sensing light controlling film GHOE, as mentioned above. It is preferable that the sensing light controlling film GHOE is attached on the upper surface of the display panel DP as facing each other. Here, the upper surface of the display panel DP is the front face providing the video images from the display panel DP. That is, the user observes the video image as seeing the upper surface of the display panel DP.

The directional optical substrate SLS, as mentioned above, may provide the image sensing light 400 to the bottom surface facing with the upper surface of the display panel DP. Therefore, the photo sensor disposed in the display panel DP located under the directional optical substrate SLS may detect the erect sensing light 401. As the results, the images of the object contacting on the upper surface of the directional optical substrate SLS may be recognized.

In detail, the radiating light 300 generated by the light radiating film VHOE of the directional optical substrate SLS would reach to the upper surface of the cover plate CP. When an object IM is disposed on the cover plate CP, the radiating light 300 hits the area where the object IM is not contacting is totally reflected and provided to the display panel DP as the sensing light 400 and then converted into the erect sensing light 401. On the contrary, the radiating light 300 hits the area where the object IM is contacting is refracted and goes out to the cover plate CP. At the point where the object IM having the refraction index larger than that of air is contacting, the radiating light 300 is not totally reflected but it is refracted into the object IM. That is, at the area where the object IM is contacting, the radiating light 300 would be an absorbed light 500 so that it is not provided to the photo sensor of the display panel DP.

As the results, the photo sensor of the display panel DP detects only the erect sensing lights 401 except the absorbed lights 500 among the radiating lights 300. Detecting the reflection patterns of the erect sensing lights 401 reflected at the top surface of the cover plate CP and then controlled its propagating direction to the perpendicular to the bottom surface, the photo sensors of the display panel DP reproduces the patterns or images of the object IM.

When applying the directional optical unit to the fingerprint sensor, the object IM would be the finger of the human. The ridge R of the fingerprint is contacting on the top surface of the cover plate CP but the valley V of the fingerprint is not contacting with the top surface of the cover plate CP. The radiating lights 300 hit the valley V are totally reflected to be the sensing lights 400. In the interim, the radiating lights 300 hit the ridge R are refracted so that they would be the absorbed lights 500 going out of the cover plate CP Further referring to lower drawings of FIG. 3, we will explain about the process of the image sensing on the XY plane. The incident light 100 may include a collimated infrared light having a predetermined cross sectional area. The light source LS may be an infrared LASER diode (or 'IR LD').

The incident light 100 would be converted to a propagating light 200 by the light incident film CHOE. Here, the propagating light 200 would be expanded as having an expanding angle φ on the XY plane including the length axis on the X axis and the width axis on the Y axis. In the interim, on the XZ plane including the length axis on the X axis and the thickness axis on the Z axis, the initial collimated condition would be maintained.

Here, it is preferable that the expanding angle φ is equal to or slightly larger than the inside angle of two lines connecting from the light incident point IP to the two end points of the cover plate CP facing the light incident film CHOE, respectively. In this case, the propagating light 200 may be expanded as having a triangular shape. As the results, the radiating lights 300 may covers the same area covered as the propagating light 200 is expanded. That is, the image sensing area would be defined inside of the triangular shape. When applying with the fingerprint sensor, the fingerprint sensing area SA may be defined as the circle area hatched in FIG. 3.

When setting the sensing area SA on the center portion or on upside-shifted portion facing with the light incident film CHOE, it is preferable that the amount (or luminance or brightness) of the radiating lights 300 has the maximum value. To do so, the light radiating film VHOE may be designed as having varying light extraction efficiency according to the functional relationship with the position, to have the maximum value at the area corresponding to the sensing area SA and to have the minimum value or the zero at the other areas.

<Second Embodiment>

Figure 4:
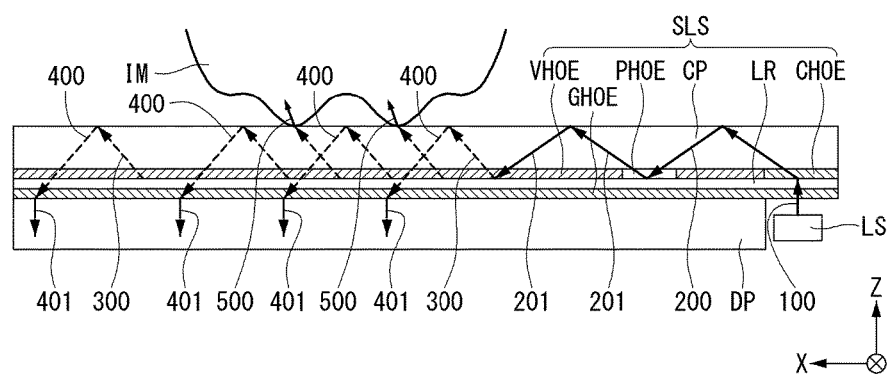
FIG. 4 is a drawing illustrating a structure of a flat panel display embedding an optical image sensor including a directional optical unit and an optical sensor, according to the second embodiment of the present disclosure.
Figure 4:
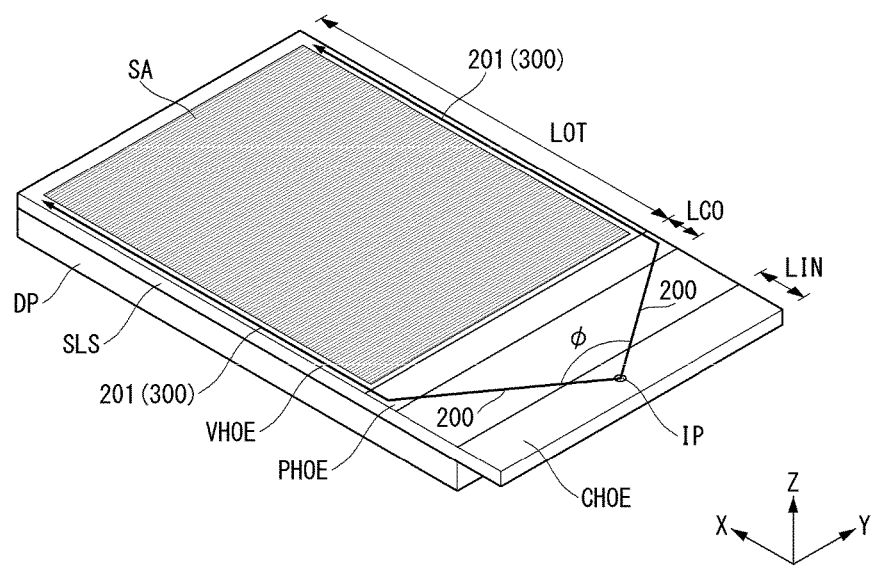

Hereinafter, referring to FIG. 4, we will explain about the second embodiment of the present disclosure. FIG. 4 is a drawing illustrating a structure of a flat panel display embedding an optical image sensor including a directional optical unit and an optical sensor, according to the second embodiment of the present disclosure.

In the second embodiment of the present disclosure, we will explain about the case in which the image sensing area SA is much wider than the first embodiment. Specifically, the most of all display area AA would be defined as the image sensing area SA. Most elements are very similar with those of the first embodiment. Description for the same would not be duplicated.

The flat panel display embedding the optical image sensor is basically similar with the first embodiment. The different point is that the flat panel display embedding the optical image sensor according to the second embodiment further comprises a horizontal collimating film PHOE for collimating the expanded propagating light 200 on the XY plane as having the collimated width corresponding to the width of the cover plate CP.

The horizontal collimating film PHOE is disposed as being spaced apart from the light incident film CHOE along the direction of the propagating light 200 along to the X axis, and as covering the width of the cover plate CP. Here, the distance from the light incident film CHOE to the horizontal collimating film PHOE may be decided variously according to the position and/or shape of the sensing area. For example, when the image sensing area SA is covering the ⅔ portions of the cover plated CP, the horizontal collimating film PHOE may be placed at the ⅓ length position of the cover plate CP from the light incident film CHOE.

In that case, the expanding angle φ may be corresponding to the inside angle between two lines connecting the light incident point IP to each of both length end points of the horizontal collimating film PHOE, respectively. The propagating light 200 having the expanding angle φ would be converted into a horizontally collimated propagating light 201 by the horizontal collimating film PHOE. Here, the radiating lights 300 would be evenly distributed over the area covering ⅔ area of the cover plate CP. The horizontal collimated film PHOE may be an optical element having a holographic pattern configured to collimate the propagating light 200 having the expanding angle of φ on the horizontal plane corresponding to the width of the cover plate CP.

Further referring to the perspective view shown in the lower portion of FIG. 4, the horizontal collimating film PHOE may be disposed at a light covering part LCO defined at the position being apart with a predetermined distance from the light entering part LIN. In the second embodiment, the image sensing area SA would be substantially same with the light going-out part LOT.

<First Application Example>

Until now, we explain about the features of the present disclosure based on the directional optical unit for providing the directional lights in the flat panel display embedding an optical image sensor. Hereinafter, we will explain about the application embodiment for the whole structure of the flat panel display embedding an optical image sensor formed by joining the flat display panel with a directional optical unit according to the present disclosure.

Figure 5:
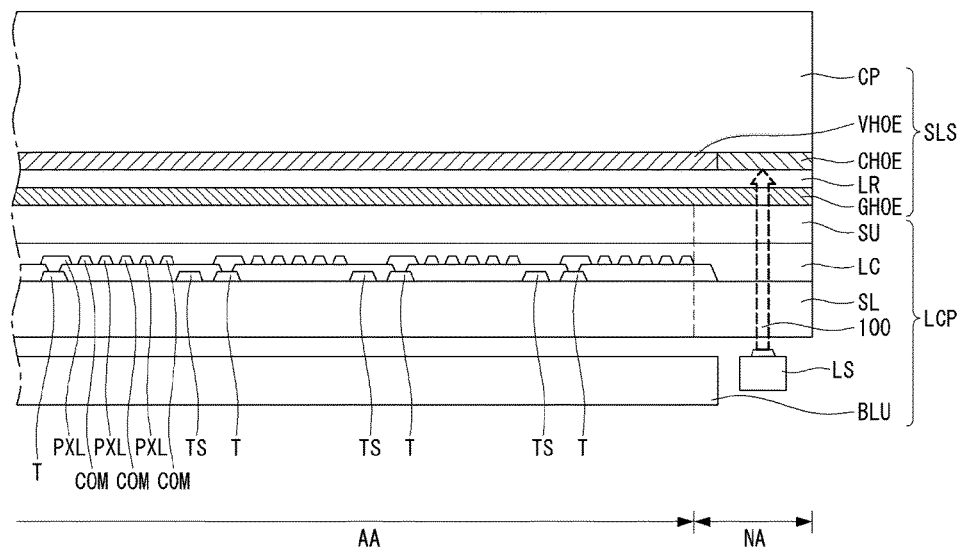
FIG. 5 is a cross sectional view illustrating a structure of a liquid crystal display embedding an optical image sensor including a directional optical unit and an optical sensor according to the first application example.

Referring to FIG. 5, we will explain about a flat panel display embedding an optical image sensor according to the first application example. FIG. 5 is a cross sectional view illustrating a structure of a liquid crystal display embedding an optical image sensor including a directional optical unit and an optical sensor according to the first application example.

The liquid crystal display embedding an optical image sensor according to the first application example comprises a liquid crystal display panel LCP, a directional optical substrate SLS and a light source LS. The liquid crystal display panel LCP includes a lower substrate SL and an upper substrate SU joining each other and a liquid crystal layer LC disposed between two substrates SL and SU. On the lower substrate SL, a plurality of the pixel areas are disposed in a matrix manner. At the upper substrate SU, a plurality of color filters is disposed as each color filter is corresponding to each pixel area. Otherwise, the upper substrate SU may have any important elements. Here, the liquid crystal display panel LCP shown in the figure is one of a horizontal electric field type. However, it is not restricted this type of liquid crystal display panel, but various type liquid crystal display panels may be used.

Within each pixel area, the pixel electrode PXL and the common electrode COM are disposed for representing video images. Further, the thin film transistor T would be disposed for selectively supplying the video signal to the pixel electrode PXL. The photo sensor TS may be disposed near the thin film transistor T. At least one photo sensor TS may be disposed at each of the pixel area. Otherwise, one photo sensor TS may be disposed at set of the pixel areas.

On the top surface of the upper substrate SU of the liquid crystal display panel LCP, the directional optical substrate SLS according to the embodiments of the present disclosure is attached in a face-to-face manner. The directional optical substrate SLS includes a cover plate CP, a light radiating film VHOE, a light incident film CHOE, a low refractive layer LR and a sensing light controlling film GHOE. The low refractive layer LR of the directional optical substrate SLS is attached with the top surface of the upper substrate SU.

The liquid crystal display panel LCP is one of the non-self emission display panel which cannot radiate the light. Therefore, a back light unit BLU may be required under the bottom surface of the low substrate SL. At one lateral side, the light source LS may be disposed as facing with the light incident film CHOE. The light source LS may be configured with the back light unit BLU as the one-body system. Otherwise, the light source LS may be disposed near the back light unit BLU as being apart from the back light unit BLU.

The liquid crystal display panel LCP includes a display area AA and a non-display area NA. The light radiating film VHOE of the directional optical substrate SLS may be disposed as corresponding to the display area AA. The light source LS may be disposed in the non-display area NA as facing with the light incident film CHOE.

<Second Application Example>

Figure 6:
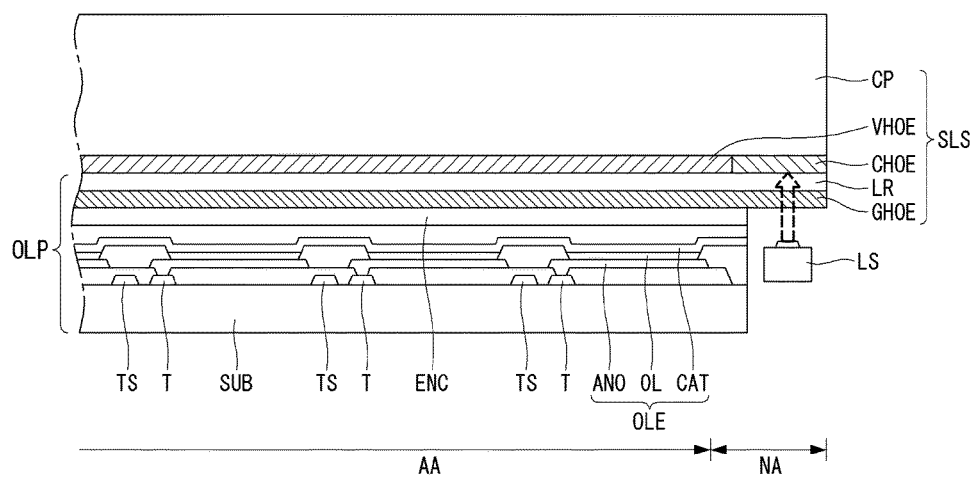
FIG. 6 is a cross sectional view illustrating a structure of an organic light emitting diode display embedding an optical image sensor including a directional optical unit and an optical sensor according to the second application example.

Referring to FIG. 6, we will explain about a flat panel display embedding an optical image sensor according to the first application example. FIG. 6 is a cross sectional view illustrating a structure of an organic light emitting diode display embedding an optical image sensor including a directional optical unit and an optical sensor according to the second application example.

The organic light emitting diode display embedding an optical image sensor according to the second application example comprises an organic light emitting diode display panel OLP, a directional optical substrate SLS and a light source LS. The organic light emitting diode display panel OLP includes a substrate SUB having the display elements and an en-cap ENC, as attaching each other in a face-to-face manner. On the substrate SUB, a plurality of pixel areas is disposed in a matrix manner. At the en-cap ENC, a plurality of color filters may be disposed as each color filter is corresponding to each pixel area. Otherwise, the en-cap ENC may be a transparent substrate without any specific elements. Here, the organic light emitting diode display panel OLP shown in the figure is one of top emission type. However, it is not restricted the top emission type, but various type including bottom emission type or both side emission type may be used.

Within each pixel area, the organic light emitting diode OLE for representing the video image and the thin film transistor T for selectively supplying the video data to the organic light emitting diode OLE. The organic light emitting diode OLE includes an anode electrode ANO, an organic light emitting layer OL and a cathode electrode CAT. The photo sensor TS may be disposed near the thin film transistor T. At least one photo sensor TS may be disposed at each of the pixel area. Otherwise, one photo sensor TS may be disposed at set of the pixel areas.

On the top surface of the en-cap ENC of the organic light emitting diode display panel OLP, the directional optical substrate SLS according to the embodiments of the present disclosure is attached in a face-to-face manner. The directional optical substrate SLS includes a cover plate CP, a light radiating film VHOE, a light incident film CHOE, a low refractive layer LR and a sensing light controlling film GHOE. The low refractive layer LR of the directional optical substrate SLS is attached with the top surface of the en-cap ENC.

The organic light emitting diode display panel OLP is one of the self emission display panel which can radiate the light. Therefore, it does not require the back light unit BLU. Therefore, it is preferable that the light source LS is disposed at one lateral side of the organic light emitting diode display OLP as facing with the light incident film CHOE.

In detail, the organic light emitting diode display panel OLP includes a display area AA and a non-display area NA. It is preferable that the directional optical substrate SLS has slightly larger size than the organic light emitting diode display panel OLP. The light radiating film VHOE of the directional optical substrate SLS may be disposed as corresponding to the display area AA. The light incident film CHOE may be disposed as covering an exterior space extended from one lateral side of the organic light emitting diode display panel OLP. The light source LS may be disposed under the exterior space as facing with the light incident film CHOE.

As mentioned above, the display embedding an optical image sensor includes a cover plate disposed at the outermost surface and an ultra thin film type holographic film having at most some hundreds μm of thickness and attached at one side of the cover plate. Therefore, the optical image sensor according to the present disclosure can be configured with the display panel in which the total thickness is not too being thicker. Further, evenly distributing the highly collimated sensing lights over the most surface of the display panel, the ultra high resolution for image sensing would be acquired. Therefore, it is very efficiency to detect tiny image pattern such as fingerprint or palm print one the large area, exactly.

While the embodiment of the present disclosure has been described in detail with reference to the drawings, it will be understood by those skilled in the art that the disclosure can be implemented in other specific forms without changing the technical spirit or essential features of the disclosure. Therefore, it should be noted that the forgoing embodiments are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A flat panel display embedding an image sensor, comprising:
 a display panel including a display area and a non-display area; and
 a directional optical unit attached to a surface of the display panel, the directional optical unit having a length and a width sized to cover the surface of the display panel and a thickness, the directional optical unit including:

a cover plate having a size corresponding to the length and the width of the directional optical unit;

a light radiating film on a first side of the cover plate, the light radiating film covers the display area under the first side of the cover plate;

a light incident film on the first side of the cover plate, the light incident film disposed outside of the display area at one lateral side of the light radiating film;

a low refractive layer disposed under the light radiating film and the light incident film, the low refractive layer having a refractive index that is lower than a refractive index of the cover plate and that is lower than a refractive index of the light radiating film;

a sensing light controlling film disposed under the low refractive layer; and a light source disposed at a lateral side of the display panel and facing the light incident film.

2. The device according to the claim 1, wherein the light source provides an incident light to an incident point defined on a surface of the light incident film;

wherein the light incident film includes a first holographic pattern that converts the incident light to a propagating light having an incident angle satisfying an internal total reflection condition of the cover plate, and that sends the propagating light into the cover plate;

wherein the light radiating film includes a second holographic pattern that converts some of the propagating light into sensing light having a reflection angle which satisfies a total reflection condition at a top surface of the cover plate and a transmitting condition through the low refractive layer; and wherein the sensing light controlling film includes a third holographic pattern that converts the sensing light into an erect sensing light that enters into the display panel at a direction perpendicular to the surface of the display panel.

3. The device according to the claim 2, wherein the propagating light has an expanding angle on a horizontal plane including a length axis of the directional optical unit and a width axis of the directional optical unit, and maintains a collimated state on a vertical plane including the length axis and a thickness axis of the directional optical unit;

wherein the incident angle of the propagating light is larger than a total reflection critical angle at a first interface between the light radiating film and the low refractive layer; and wherein the reflection angle of the sensing light is larger than a total reflection critical angle at a second interface between the cover plate and an air layer, and smaller than the total reflection critical angle at the first interface between the light radiating film and the low refractive layer.

4. The device according to the claim 3, wherein the expanding angle is equal to or greater than an inner angle between a first line and a second line, the first line is a line connecting the incident point and one end of an opposite side of the cover plate facing the light incident film, and the second line is a line connecting the incident point and another end of the opposite side of the cover plate.

5. The device according to the claim 3, wherein the directional optical unit further comprises:

a horizontal collimating film disposed spaced apart from the light incident film along a direction of the propagating light and covering the width of the directional optical unit, wherein the expanding angle is equal to or greater than an inner angle between a first line and a second line, the first line is a line connecting the incident point and one end of the horizontal collimating film, and the second line is a line connecting the incident point and another end of the horizontal collimating film, and wherein the horizontal collimating film has a fourth holographic pattern for horizontally collimating the propagating light having the expanding angle on the horizontal plane corresponding to the width.

6. The device according to claim 5, wherein the horizontal collimating film is disposed between the cover plate and the low refractive layer.

7. The device according to claim 6, wherein a side surface of the horizontal collimating film abuts a side surface of the light radiating film.

8. The device according to the claim 1, wherein the light source provides a collimated light having a circular cross-sectional shape.

9. The device according to claim 1, wherein the light source is spaced apart from the lateral side of the display panel along a first direction, and the light source is spaced apart from the light incident film along a second direction that is transverse to the first direction.

10. The device according to claim 1, wherein a side surface of the light incident film abuts a side surface of the light radiating film.

11. The device according to claim 1, wherein the refractive index of the low refractive layer is about 1.4, the refractive index of the cover plate is about 1.5, and the refractive index of the light radiating film is about 1.5.

12. A flat panel display embedding an image sensor, comprising:

a display panel including a display area and a non-display area; and a directional optical unit attached to the display panel, the directional optical unit including:

a light source adjacent to a first side of the display panel;

a cover plate that covers the display panel, a portion of the cover plate extending beyond the first side of the display panel and overlapping the light source;

a light incident film on the portion of the cover plate that overlaps the light source, the light incident film disposed between the cover plate and the light source, the light incident film including a first holographic pattern that converts incident light received from the light source to a propagating light having an incident angle satisfying an internal total reflection condition of the cover plate and transmits the propagating light into the cover plate;

a light radiating film on the cover plate and disposed between the cover plate and the display panel, the light radiating film covering at least a portion of the display area of the display panel, the light radiating film including a second holographic pattern that converts some of the propagating light into sensing light having a reflection angle which satisfies a total reflection condition at a top surface of the cover plate and that satisfies a transmitting condition through the low refractive layer;

a low refractive layer on the light radiating film and the light incident film, the low refractive layer having a refractive index that is lower than a refractive index of the cover plate and that is lower than a refractive index of the light radiating film; and a sensing light controlling film between the low refractive layer and the display panel, the sensing light controlling film including a third holographic pattern that converts the sensing light into an erect sensing light that enters into the display panel at a direction perpendicular to the surface of the display panel.

13. The device according to claim 12, wherein the light source provides a collimated light having a circular cross-sectional shape.

14. The device according to claim 12, wherein the light source is spaced apart from the first side of the display panel along a first direction, and the light source is spaced apart from the light incident film along a second direction that is transverse to the first direction.

15. The device according to claim 12, wherein a side surface of the light incident film abuts a side surface of the light radiating film.

16. The device according to claim 12, wherein the directional optical unit further comprises:
 a horizontal collimating film on the cover plate and disposed between the cover plate and the low refractive layer, the horizontal collimating film spaced laterally apart from the light incident film along a direction of the propagating light, the horizontal collimating film including a fourth holographic pattern that horizontally collimates at least a portion of the propagating light.

17. The device according to claim 16, wherein a side surface of the horizontal collimating film abuts a side surface of the light radiating film.

* * * * *